United States Patent
Chen et al.

(10) Patent No.: US 10,180,678 B2
(45) Date of Patent: Jan. 15, 2019

(54) METHOD FOR IMPROVED 3-D PRINTING SYSTEM AND SYSTEM THEREOF

(71) Applicant: Young Optics Inc., Hsinchu (TW)

(72) Inventors: Chao-Shun Chen, Hsinchu (TW); Chang-Chun Chen, Hsinchu (TW); Ming-Fu Hsu, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 77 days.

(21) Appl. No.: 15/222,203

(22) Filed: Jul. 28, 2016

(65) Prior Publication Data

US 2018/0029308 A1 Feb. 1, 2018

(51) Int. Cl.
G05B 19/40 (2006.01)
B33Y 50/02 (2015.01)
G05B 19/408 (2006.01)
G05B 19/4099 (2006.01)

(52) U.S. Cl.
CPC ..... *G05B 19/4083* (2013.01); *G05B 19/4099* (2013.01); *B33Y 50/02* (2014.12); *G05B 2219/49023* (2013.01)

(58) Field of Classification Search
CPC ........ G03B 27/32; G03B 35/14; G06F 3/1259
USPC .................. 700/98, 118, 119, 120
See application file for complete search history.

(56) References Cited

U.S. PATENT DOCUMENTS

| | | | |
|---|---|---|---|
| 8,611,615 B2 | 12/2013 | Yokokawa et al. | |
| 9,153,015 B2 | 10/2015 | Toyoda et al. | |
| 9,202,263 B2 | 12/2015 | Pavani | |
| 9,202,416 B2 | 12/2015 | Ozawa et al. | |
| 9,833,948 B2* | 12/2017 | Stava ................... | B29C 64/386 |
| 2017/0032580 A1* | 2/2017 | Hemani .................. | G06T 19/20 |

* cited by examiner

*Primary Examiner* — Michael J Brown
(74) *Attorney, Agent, or Firm* — WPAT, PC

(57) ABSTRACT

A method for an improved 3-D printing system and a system thereof is disclosed. The method is able to blur and sharpen pattern images, and the system is flexible in assembly in order to benefit the convenience of printing, the speed of printing, and the cost of hardware and manufacturing.

20 Claims, 9 Drawing Sheets a filter adjusting system 14" of an improved 3-D printing system 1" receiving a resolution of a filter based on a pattern image that is waiting for 3-D printing — S1"

obtaining plural filter parameters 1121" — S2"

a calculation control system 15" of the improved 3-D printing system 1" transmitting the filter parameters 152" and plural sliced printing files 13" to a blurring and sharpening device 151" of the calculation control system 15" of the improved 3-D printing system 1" for making a calculation — S3"

obtaining a calculation value — S4"

providing the calculation value to a printing control system 111" of the 3- D printing system 11" for engaging a printing work — S5"

METHOD FOR IMPROVED 3-D PRINTING SYSTEM AND SYSTEM THEREOF

BACKGROUND OF THE INVENTION

1. Field of the Invention

The present invention generally relates to a method for an improved 3-D printing system and a system thereof, more particularly to a method that is able to blur and sharpen pattern images for an improved 3-D printing system and a system thereof.

2. Description of the Prior Art

In order to obtain better 3-D printing output, some places of a 3-D printed product may be needed for trimming/re-machining residues, and some portions must be rough. The post treating for those places and portions may not meet the different requirements of designers, and it becomes an important issue for people skilled in the art.

SUMMARY OF THE INVENTION

One embodiment for an improved 3-D printing system, which blurs and sharpen pattern images in order to gain better output printing quality, comprises the steps of:
a filter adjusting system determining a resolution of a filter based on at least one pattern image in order to obtain a plurality of filter parameters;
a blurring and sharpening device making a calculation to the filter parameters and a plurality of sliced printing files so as to obtain a calculation value; and
using a printing control system of a 3-D printing system to engage in a printing work via the calculation value.

The embodiment of the present invention provides a method for better output 3-D printing quality, and the assembly of the system is flexible in order to benefit the convenience of printing, the speed of printing, and the cost of hardware and manufacturing.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

FIGS. 9-1 and 9-2 illustrate two states of blurring and sharpening two sliced images that are processed by CAD.

DETAILED DESCRIPTION OF THE INVENTION

Following preferred embodiments and figures will be described in detail so as to achieve aforesaid objects.

Figure 1:
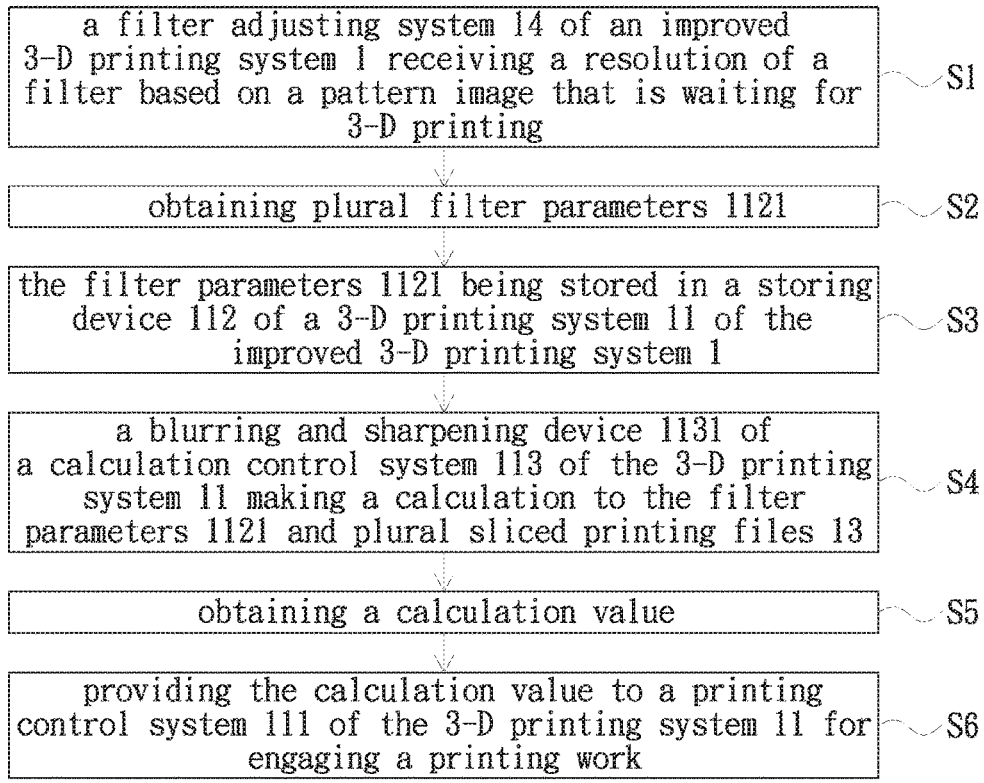
FIG. 1 illustrates a flow chart of a first preferred embodiment of the present invention.
Figure 2:
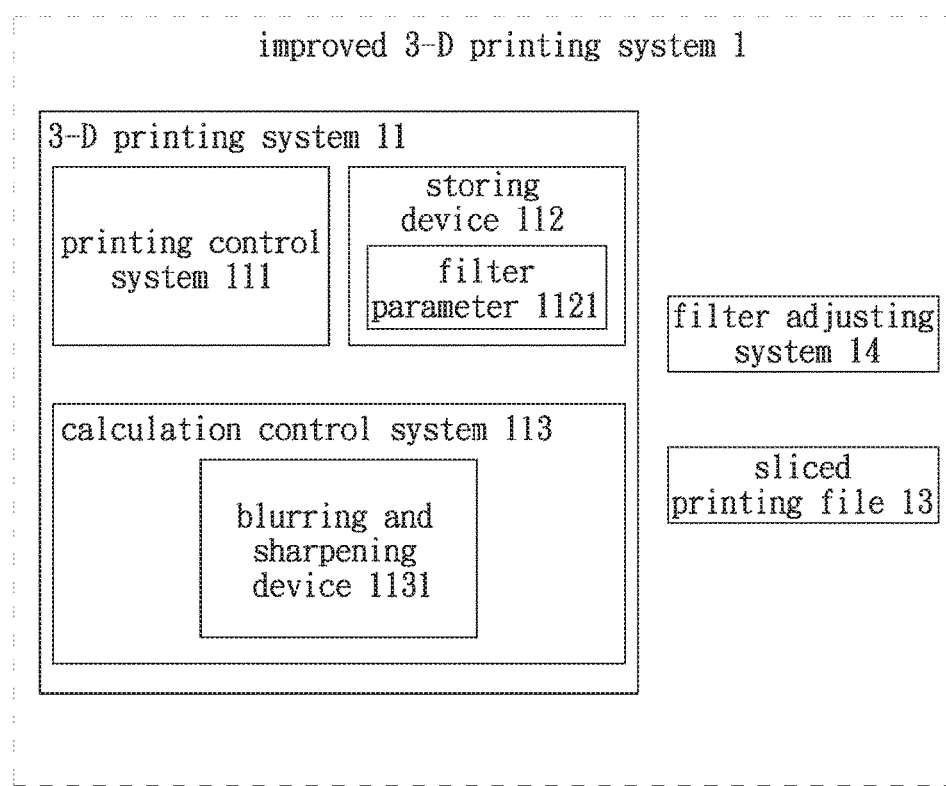
FIG. 2 illustrates a schematic module view of the first preferred embodiment of the present invention.
Figures 1, 9:
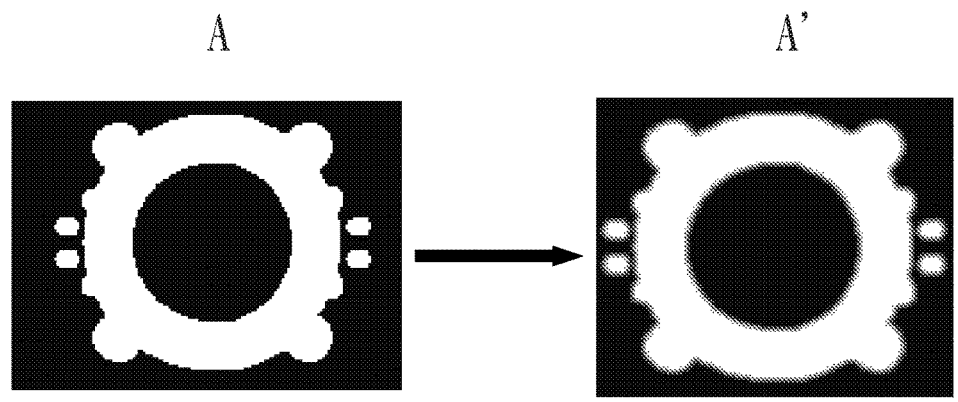
Figures 2, 9:
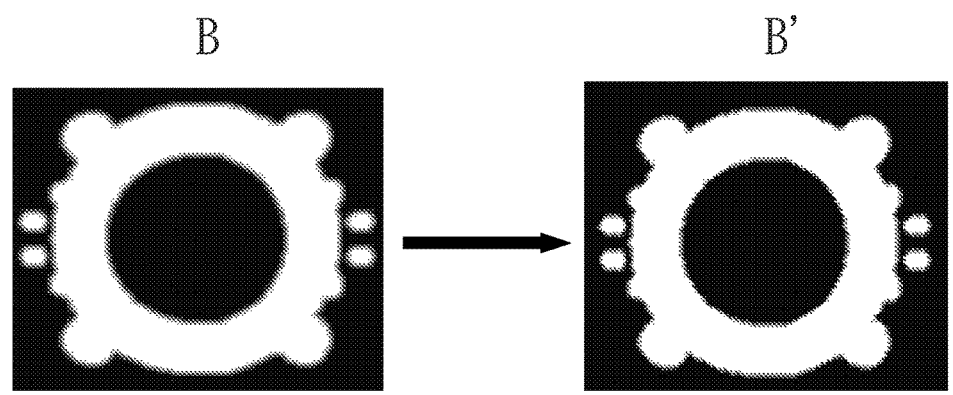

Please refer to FIGS. 9-1 and 9-2, which illustrate two states of blurring and sharpening two sliced images that are processed by CAD. As it can be seen, the edges of a sliced image A are very sharp, but the sharp edges may hurt people after 3-D printing out. So, to smooth those edges to become the edges of a sliced image A' is a want. On the contrary, to sharp the edges of a sliced image B for forming the edges of a sliced image B' is another want, since different applications may be varied with different shapes.

Please refer to FIG. 1 and FIG. 2, which illustrate a flow chart and a schematic module view of a first preferred embodiment of the present invention. As shown in FIG. 1, the method for the improved 3-D printing system 1, blurring and sharpening pattern images in order to gain better output printing quality, comprises the steps of:
(S1) a filter adjusting system 14 of the improved 3-D printing system 1 receiving a resolution of a filter based on a pattern image that is waiting for 3-D printing;
(S2) obtaining a plurality of filter parameters 1121;
(S3) the plurality of filter parameters 1121 being stored in a storing unit 112 of a 3-D printing system 11 of the improved 3-D printing system 1;
(S4) a blurring and sharpening device 1131 of a calculation control system 113 of the 3-D printing system 11 making a calculation to the filter parameters 1121 and a plurality of sliced printing files 13;
(S5) obtaining a calculation value;
(S6) providing the calculation value to a printing control system 111 of the 3-D printing system 11 for engaging a printing work.

As shown in FIG. 2, the improved 3-D printing system 1, blurring and sharpening pattern images in order to gain better output printing quality, comprises:
the filter adjusting system 14, receiving the resolution of the filter based on the pattern image in order to obtain the plurality of filter parameters 1121;
the blurring and sharpening device 1131, making a calculation to the filter parameters 1121 and the plurality of sliced printing files 13 so as to obtain the calculation value;
the 3-D printing system 11, comprising the printing control system 111 so as to engage in the printing work via the calculation value;
the calculation control system 113, comprising the blurring and sharpening device 1131, being in the 3-D printing system 11, and controlling the calculation that is to calculate the filter parameters 1121 and the plurality of sliced printing files 13; and
the storing device 112, being in the 3-D printing system 11 and storing the plurality of filter parameters 1121.

The advantage of the first preferred embodiment is to increase the convenience of printing since the calculation control system 113 is in the 3-D printing system 11.

Figure 3:
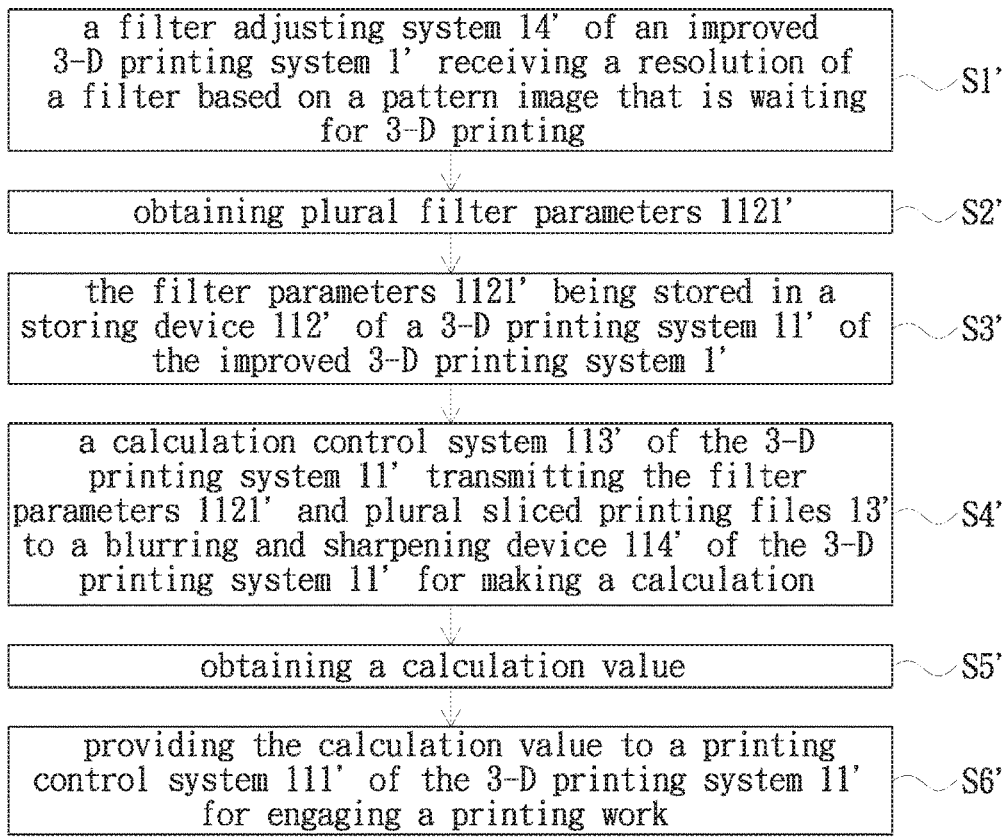
FIG. 3 illustrates a flow chart of a second preferred embodiment of the present invention.
Figure 4:
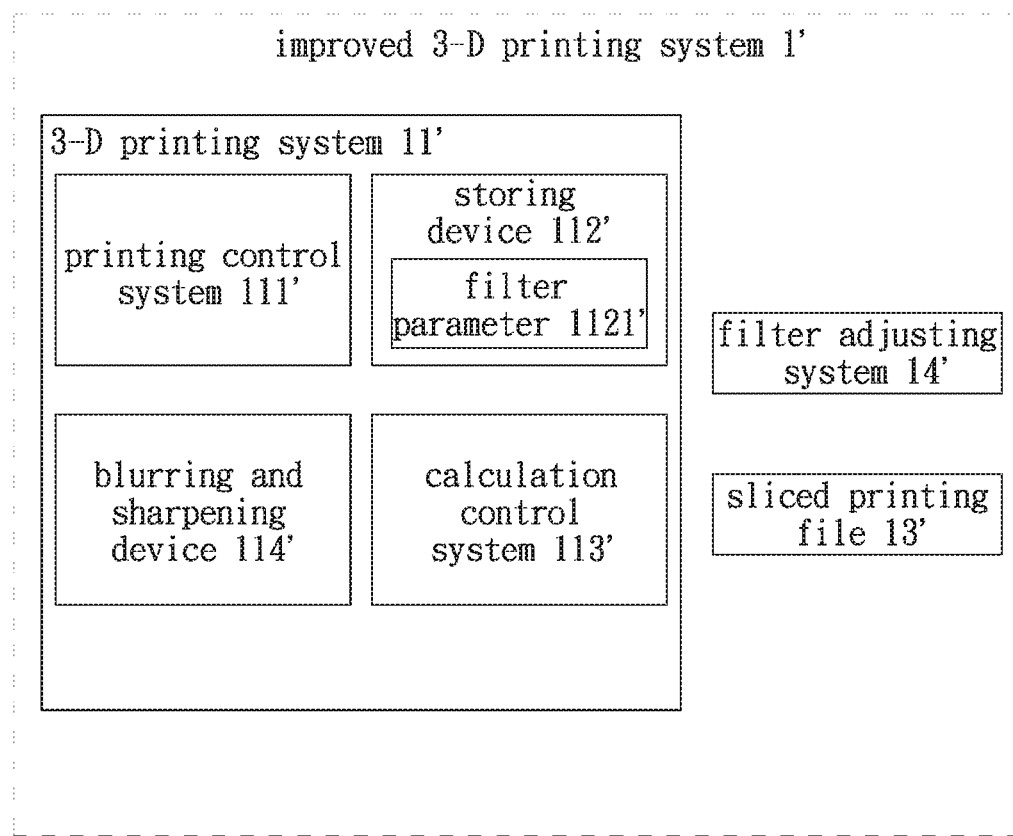
FIG. 4 illustrates a schematic module view of the second preferred embodiment of the present invention.

Please refer to FIG. 3 and FIG. 4, which illustrate a flow chart and a schematic module view of a second preferred embodiment of the present invention. As shown in FIG. 3, the method for the improved 3-D printing system 1', blurring and sharpening pattern images in order to gain better output printing quality, comprises the steps of:

(S1') a filter adjusting system 14' of the improved 3-D printing system 1' receiving a resolution of a filter based on a pattern image that is waiting for 3-D printing;
(S2') obtaining a plurality of filter parameters 1121';
(S3') the plurality of filter parameters 1121' being stored in a storing device 112' of a 3-D printing system 11' of the improved 3-D printing system 1';
(S4') a calculation control system 113' of the 3-D printing system 11' transmitting the filter parameters 1121' and a plurality of sliced printing files 13' to a blurring and sharpening device 114' of the 3-D printing system 11' for making a calculation;
(S5') obtain a calculation value; and
(S6') providing the calculation value to a printing control system 111' of the 3-D printing system 11' for engaging a printing work.

As shown in FIG. 4, the improved 3-D printing system 1', blurring and sharpening pattern images in order to gain better output printing quality, comprises:
the filter adjusting system 14', receiving the resolution of the filter based on the pattern image in order to obtain the plurality of filter parameters 1121';
the blurring and sharpening device 114', making a calculation to the filter parameters 1121' and the plurality of sliced printing files 13' so as to obtain the calculation value;
the 3-D printing system 11', comprising the printing control system 111' so as to engage in the printing work via the calculation value;
the calculation control system 113', being in the 3-D printing system 11', and controlling the calculation that is to calculate the filter parameters 1121' and the plurality of sliced printing files 13'; and
the storing device 112', being in the 3-D printing system 11' and storing the plurality of filter parameters 1121'.

Due to adopting a hardware accelerator as GPU, FPGA, etc., to be the blurring and sharpening device 114' for the second preferred embodiment, the speed of printing may be tremendously increased.

Figure 5:
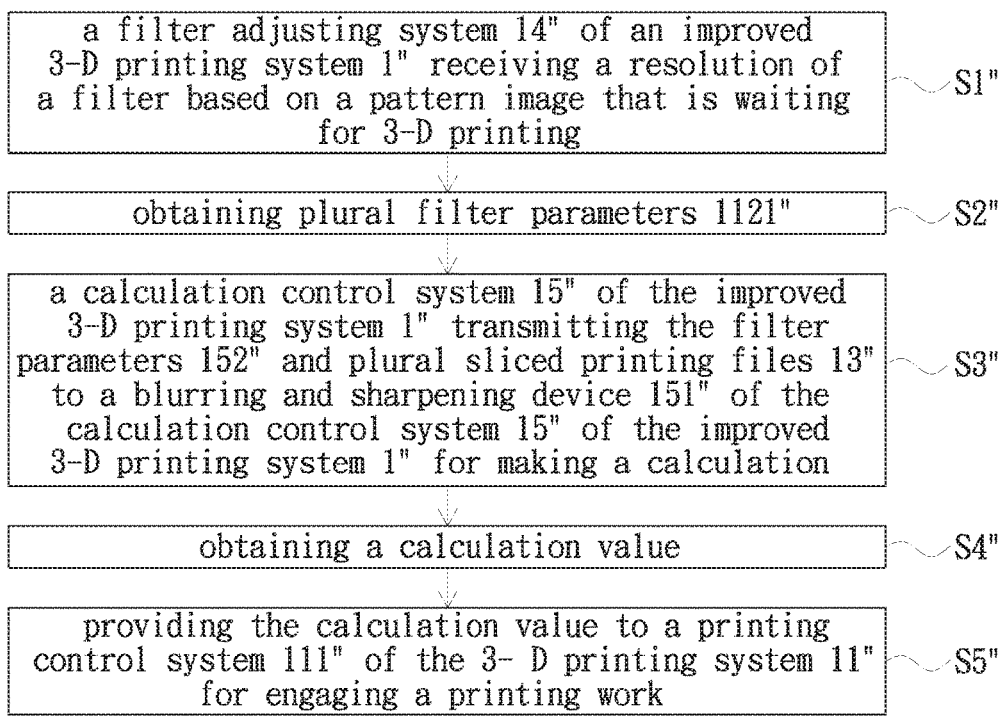
FIG. 5 illustrates a flow chart of a third preferred embodiment of the present invention.
Figure 6:
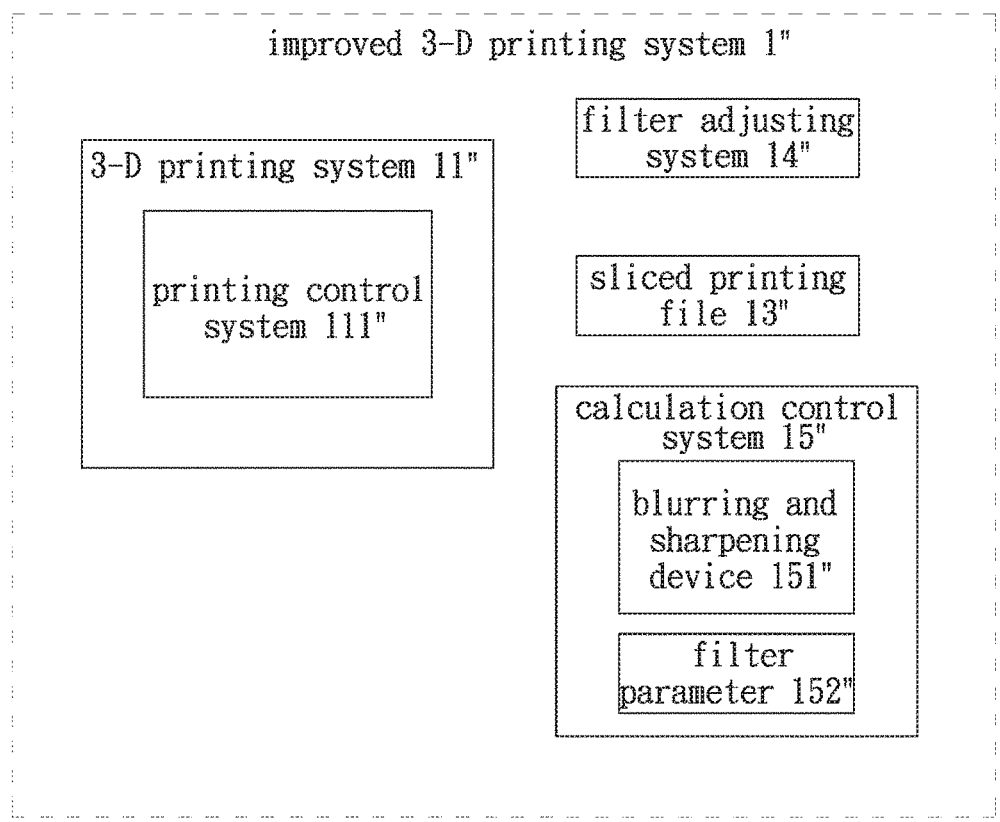
FIG. 6 illustrates a schematic module view of the third preferred embodiment of the present invention.

Please refer to FIG. 5 and FIG. 6, which illustrate a flow chart and a schematic module view of a third preferred embodiment of the present invention. As shown in FIG. 5, the method for the improved 3-D printing system 1", blurring and sharpening pattern images in order to gain better output printing quality, comprises the steps of:

(S11") a filter adjusting system 14" of an improved 3-D printing system 1" receiving a resolution of a filter based on a pattern image that is waiting for 3-D printing;
(S12") obtaining a plurality of filter parameters 152";
(S13") a calculation control system 15" of the improved 3-D printing system 1" transmitting the filter parameters 152" and a plurality of sliced printing files 13" to a blurring and sharpening device 151" of the calculation control system 15" of the improved 3-D printing system 1" for making a calculation;
(S14") obtaining a calculation value; and
(S15") providing the calculation value to a printing control system 111" of the 3-D printing system 11" for engaging a printing work.

As shown in FIG. 6, the improved 3-D printing system 1", blurring and sharpening pattern images in order to gain better output printing quality, comprises:
the filter adjusting system 14", receiving the resolution of the filter based on the pattern image in order to obtain the plurality of filter parameters 152";
the blurring and sharpening device 151", making a calculation to the filter parameters 152" and the plurality of sliced printing files 13" so as to obtain a calculation value;
the 3-D printing system 11", comprising the printing control system 111" so as to engage in the printing work via the calculation value; and
the calculation control system 15", comprising the blurring and sharpening the device 151" and the filter parameters 152", and controlling the calculation that is to calculate the filter parameters 152" and the plurality of sliced printing files 13".

Because of the calculation control system 15", such as software and/or hardware, with the blurring and sharpening device 151" being outside of the 3-D printing system 11" for the third preferred embodiment, the speed of printing can be increased and the cost of hardware is lowered.

In practice, the 3-D printing system 11/11'/11" could be a 3-D printer; the printing control system 111/111'/111" could be a projector, a laser control system, an FDM (Fused Deposition Modeling), etc.; the storing device 112/112' could be a flash memory, an SDRAM, etc.; the calculation control system 113/113'/15" could be a PC, a CPU, a software, a firmware, or a network system in order to calculate the filter parameters 1121/1121'/152" and the plurality of sliced printing files 13/13'/13"; the blurring and sharpening device 1131/114'/151" could be a hardware as FPGA (Field-Programmable Gate Array), a software written by C language, a firmware, etc.; and the filter adjusting system 14/14'/14" could be an operation interface as operation panel. In another embodiment, the filter parameter 1121/1121'/152" could be a fixed value without using the filter adjusting system 14/14'/14".

When aforesaid filter is a time domain filter, the calculation is a convolution; otherwise, the calculation is a Fourier transform if the filter is a frequency domain filter.

Figure 7:
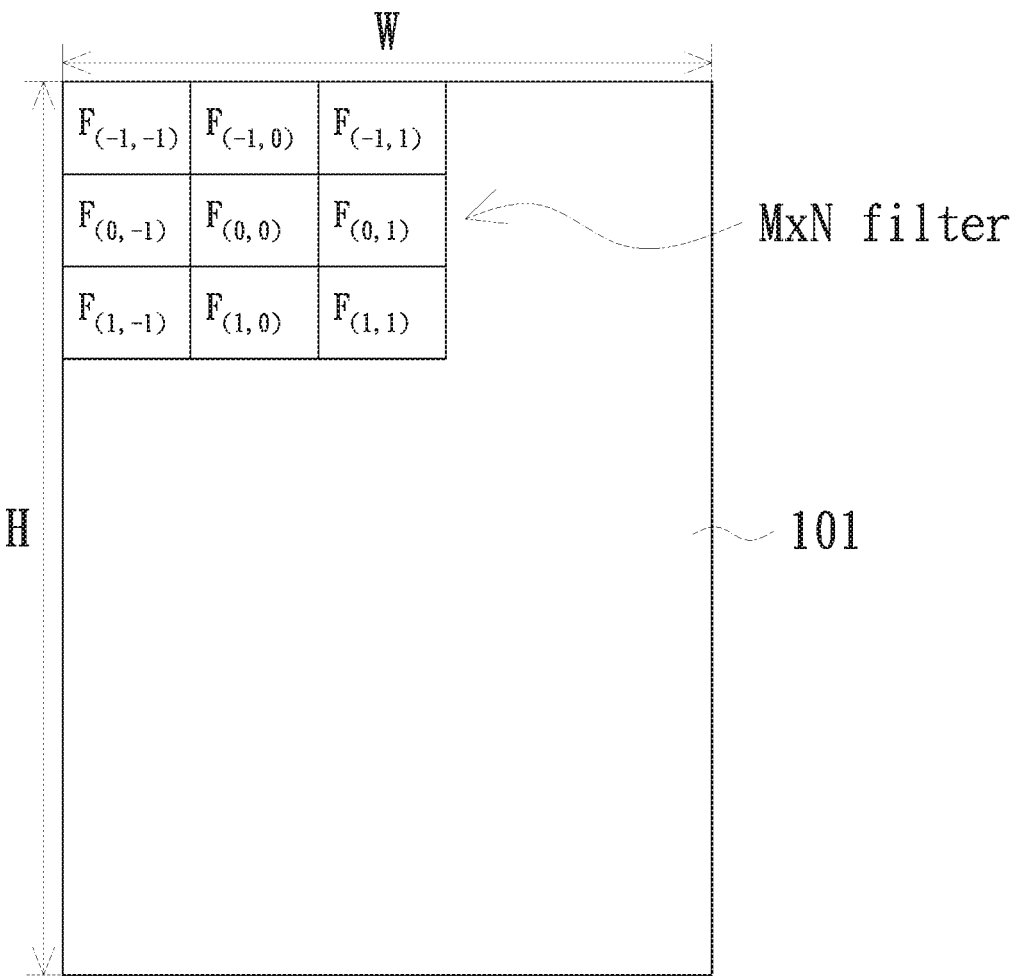
FIG. 7 illustrates a schematic view of making a convolution of plural filter parameters and a sliced printing file of another embodiment of the present invention.

According to FIG. 7, which illustrates a schematic view of making a convolution of plural filter parameters and a sliced printing file of another embodiment of the present invention. Based on requirements of printing, a filter, such as software, hardware and firmware, not shown in FIG. 7, scans the sliced printing image from left to right (or right to left). Each movement of scanning is a pixel in order to obtain a pixel luminance. After the whole area of the sliced printing image is scanned, the calculation for the sliced printing image is done according to the following equation:

$$O(x, y) = \sum_{i=-m/2}^{m/2} \sum_{j=-n/2}^{n/2} F(i, j)I(x+i, y+j)$$

Wherein I(x,y) is defined as input pixel of sliced printing image, F(i,j) is defined as M×N filter, O(x,y) is defined as output pixel of sliced printing image, and $0 \leq x < W$, $0 \leq y < H$, wherein W is the width of sliced printing image and H is the height of sliced printing image. Above mentioning is a convolution calculation.

Figure 8:
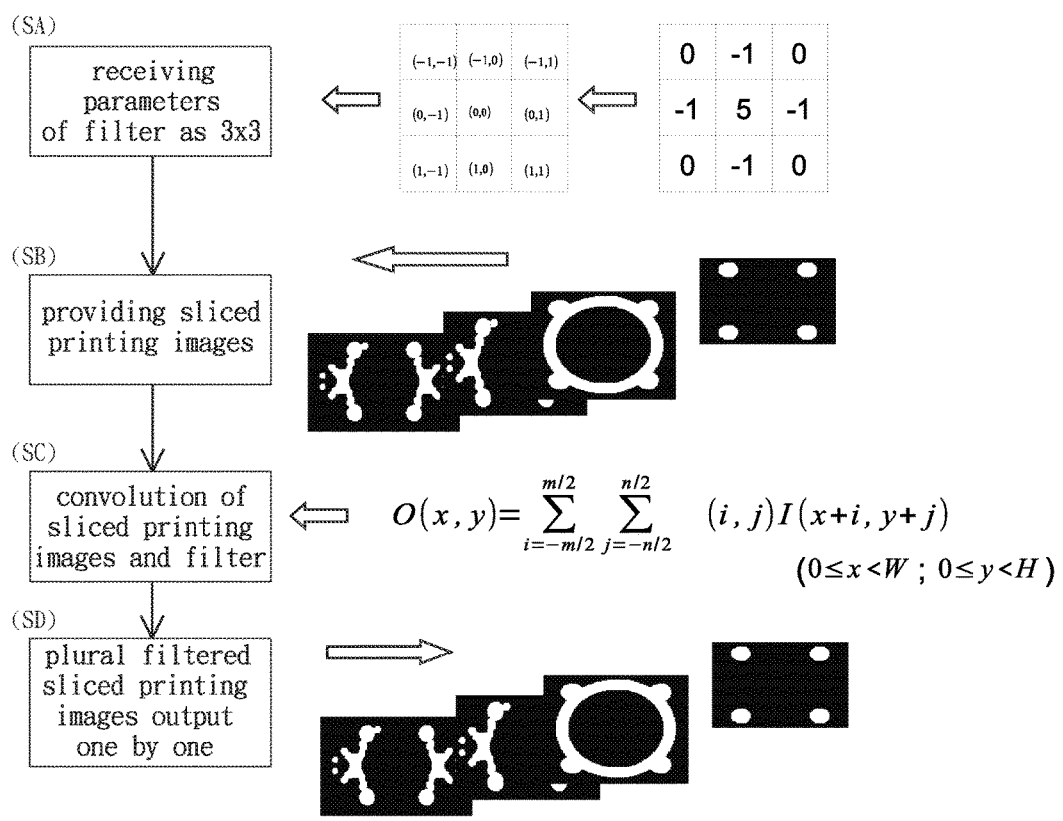
FIG. 8 illustrates a schematic practical flow chart of another embodiment of the present invention.

Please refer to FIG. 8, which illustrates a schematic practical flow chart of another embodiment of the present invention. As shown in FIG. 8, the steps are that of:
(SA) receiving a plurality of parameters of a filter, wherein the filter could be 3×3, such as the resolution of the filter, further, other larger or smaller filters can be applied as well, and are not limited thereto;

(SB) inputting a plurality of sliced printing images/files;
(SC) making a convolution of the plurality of sliced printing images/files and the plurality of parameters; and
(SD) outputting a plurality of filtered sliced printing images/files.
Wherein the amounts of parameter and resolution are equal to each other.

The embodiment of present invention provides the method for the improved 3-D printing system and the system thereof, wherein the method is to blur and sharpen pattern images for better output 3-D printing quality, and the assembly of the system is flexible in order to benefit the convenience of printing, the speed of printing, and the cost of hardware. For example, a better 3-D printing product may not be with residues at edges, and it should not be machined twice, so as to reduce manufacturing cost.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for an improved 3-D printing system, comprising the steps of:
    a blurring and sharpening device making a calculation to a plurality of filter parameters and a plurality of sliced printing files so as to obtain a calculation value; and
    using a printing control system of a 3-D printing system to engage in a printing work via the calculation value.

2. The method for the improved 3-D printing system according to claim 1 further comprising the steps of:
    a filter adjusting system of the improved 3-D printing system receiving a resolution of a filter based on a pattern image that is waiting for 3-D printing; and
    obtaining the plurality of filter parameters.

3. The method for the improved 3-D printing system according to claim 2 further comprising the steps of:
    the plurality of filter parameters being stored in a storing device of the 3-D printing system of the improved 3-D printing system;
    the blurring and sharpening device of a calculation control system of the 3-D printing system making a calculation to the filter parameters and the plurality of sliced printing files; and
    obtaining the calculation value.

4. The method for the improved 3-D printing system according to claim 3 further comprising the step of:
    providing the calculation value to the printing control system of the 3-D printing system for engaging the printing work.

5. The method for the improved 3-D printing system according to claim 2 further comprising the steps of:
    the plurality of filter parameters being stored in a storing device of the 3-D printing system of the improved 3-D printing system;
    a calculation control system of the 3-D printing system transmitting the filter parameters and the plurality of sliced printing files to the blurring and sharpening device of the 3-D printing system for making a calculation; and
    obtain the calculation value.

6. The method for the improved 3-D printing system according to claim 5 further comprising the step of:
    providing the calculation value to the printing control system of the 3-D printing system for engaging the printing work.

7. The method for the improved 3-D printing system according to claim 2 further comprising the steps of:
    a calculation control system of the improved 3-D printing system transmitting the filter parameters and the plurality of sliced printing files to the blurring and sharpening device of the calculation control system of the improved 3-D printing system for making a calculation; and
    obtaining the calculation value.

8. The method for the improved 3-D printing system according to claim 7 further comprises the step of:
    providing the calculation value to the printing control system of the 3-D printing system for engaging the printing work.

9. The method for the improved 3-D printing system according to claim 1, wherein a filter is selected from the group consisting of: a time domain filter when the calculation is a convolution, and a frequency domain filter when the calculation is a Fourier transform.

10. An improved 3-D printing system comprising:
    a device for blurring and sharpening a plurality of pattern images, which makes a calculation to a plurality of filter parameters and a plurality of sliced printing files so as to obtain a calculation value; and
    a system for 3-D printing, which comprises a system for controlling printing that engages in a printing work via the calculation value.

11. The improved 3-D printing system according to claim 10 further comprising:
    a system for adjusting a filter, which receives a resolution of the filter based on at least one pattern image in order to obtain the plurality of filter parameters;
    a system for controlling calculation, wherein the calculation is to calculate the filter parameters and the plurality of sliced printing files, comprising the device for blurring and sharpening the pattern image and being in the system for 3-D printing; and
    a device for storing, being in the system for 3-D printing and storing the plurality of filter parameters.

12. The improved 3-D printing system according to claim 10 further comprising:
    a system for adjusting a filter, which receives a resolution of a filter based on at least one of the pattern images in order to obtain the plurality of filter parameters;
    a system for controlling calculation, wherein the calculation is to calculate the filter parameters and the plurality of sliced printing files, being in the system for 3-D printing; and
    a device for storing, being in the system for 3-D printing and storing the plurality of filter parameters.

13. The improved 3-D printing system according to claim 10 further comprising:
    a system for adjusting a filter, which receives a resolution of a filter based on at least one of the pattern images in order to obtain the plurality of filter parameters; and
    a system for controlling calculation, wherein the calculation is to calculate the filter parameters and the plurality of sliced printing files, comprising the device for blurring and sharpening the pattern images and the filter parameters, and being in the 3-D printing system.

14. The improved 3-D printing system according to claim 10, wherein a filter is selected from the group consisting of: a time domain filter when the calculation is a convolution, and a frequency domain filter when the calculation is a Fourier transform.

15. An improved 3-D printing system comprising:
   an FPGA (Field-Programmable Gate Array), making a calculation to a plurality of filter parameters and a plurality of sliced printing files so as to obtain a calculation value; and
   a 3-D printer, comprising a projector so as to engage in a printing work via the calculation value.

16. The improved 3-D printing system according to claim 15 further comprising an operation interface, which receives a resolution of a filter based on at least one pattern image in order to obtain the plurality of filter parameters.

17. The improved 3-D printing system according to claim 16 further comprising:
   a PC, comprising the FPFA, being in the 3-D printer, and controlling the calculation that is to calculate the filter parameters and the plurality of sliced printing files; and
   a flash memory, being in the 3-D printer and storing the plurality of filter parameters.

18. The improved 3-D printing system according to claim 16 further comprising:
   a PC, being in the 3-D printer, and controlling the calculation that is to calculate the filter parameters and the plurality of sliced printing files; and
   a flash memory, being in the 3-D printer and storing the plurality of filter parameters.

19. The improved 3-D printing system according to claim 16 further comprising:
   a PC, being in the 3-D printer, comprising the FPGA and the filter parameters, and controlling the calculation that is to calculate the filter parameters and the plurality of sliced printing files.

20. The improved 3-D printing system according to claim 16, wherein the calculation for the FPGA is selected from the group consisting of: convolution and Fourier transform.

* * * * *